United States Patent [19]
Priebe

[11] 3,894,279
[45] July 8, 1975

[54] APPARATUS FOR SYNCHRONOUS SMOOTHING OF CURRENT RIPPLE

[75] Inventor: Edward P. Priebe, North East, Pa.

[73] Assignee: General Electric Company, Erie, Pa.

[22] Filed: Jan. 4, 1974

[21] Appl. No.: 430,716

[52] U.S. Cl. .................. 321/10; 323/51; 323/52; 336/135
[51] Int. Cl. ................. H02m 1/14; H01f 29/12
[58] Field of Search ......... 321/10; 333/79; 336/120, 336/134, 135, 178; 323/51, 52

[56] References Cited
UNITED STATES PATENTS

| | | | |
|---|---|---|---|
| 1,659,071 | 2/1928 | Applebaum | 323/52 |
| 2,292,809 | 8/1942 | Welch | 336/135 |
| 2,368,701 | 2/1945 | Borden | 336/120 |
| 2,674,705 | 4/1954 | Schwieg | 323/51 |
| 3,518,595 | 6/1970 | Dawson et al. | 336/135 |
| 3,603,864 | 9/1971 | Thaler | 321/10 |
| 3,761,797 | 9/1973 | Spooner | 321/10 |

Primary Examiner—William H. Beha, Jr.
Attorney, Agent, or Firm—D. F. Bigelow

[57] ABSTRACT

The flux linkage of an electromagnet system is changed in synchronism with rectified current ripple and the resulting induced voltage produces a smoothing action of the ripple current to be applied to a load. Flux linkage change is accomplished by the rotation of a rotor in the field of a stator structure at a speed proportional to the ripple current frequency.

5 Claims, 3 Drawing Figures

APPARATUS FOR SYNCHRONOUS SMOOTHING OF CURRENT RIPPLE

BACKGROUND OF THE INVENTION

This invention relates generally to electricity conversion systems and more particularly to active reactors for smoothing the current of a rectified a-c power source.

It is common to provide a direct current power supply by the rectification of an alternating current source. In some applications the resulting unidirectional current with an alternating or ripple component is satisfactory for use. However, in a number of applications, a high ripple component cannot be tolerated and must be reduced to an acceptable level by the use of smoothing circuits.

Common methods of reducing ripple to acceptable levels employ passive energy storage elements. Energy is stored during intervals of high rectified voltage for release during intervals of low rectified voltage. Series inductors and shunt capacitors are commonly used in L, T, and π arrangements to accomplish smoothing in this manner. However, it is not possible to totally remove ripple with any combination of passive devices.

The size of the energy storage elements increases with the degree of filtering and the amount of power, and increases with decreasing line frequency. Single phase supply necessitates larger filter elements than polyphase supply.

Where the a-c power source is a low frequency single phase source, and a large amount of power is involved, as is common in electric railway systems, the energy storage elements become very large. A single series inductor is commonly used for ripple suppression.

In the case of electric traction motors supplied with unidirectional current by rectification of low frequency a-c collected from the wayside, appreciable smoothing may be needed. Direct current traction motors are required to provide high power output over wide speed ranges with severe limitations on size and weight. Ripple in traction motor current causes increased heating, deterioration of commutation, and torque pulsation. It is therefore necessary to limit current ripple.

The need for smoothing traction motor current varies with operating conditions. Typically combinations of high voltage and low current require greatest smoothing, and less smoothing is required under conditions of lower voltage and higher current. Advantage is commonly taken of this characteristic to decrease the size of a series filter inductor by permitting saturation at high current. This factor and the inherent ineffectiveness of capacitors at low frequencies has lead to general use of simple series inductors for smoothing rectified power in railway service. Even so, inductors tend to be large and heavy because a large amount of electromagnet energy stored in the inductor by the direct current is not active in producing smoothing. Only that portion of the energy cyclicly stored and released by the undulating current is active in producing smoothing. This limitation is inherent in any passive device.

It is therefore an object of this invention to provide an improved method and device for smoothing a-c rectified current for application to a load.

Another object of this invention is the provision in a unidirectional current filter system for a minimum amount of impedance.

Yet another object of this invention is the provision for an inductive filter device of minimum size and weight.

Still another object of this invention is the provision for smoothing a rectified power source of low frequency and high power.

A further object of this invention is the provision for a current smoothing system which is economical to fabricate and effective in use.

These objects and other features and advantages become more readily apparent upon reference to the following description when taken in conjunction with the appended drawings.

SUMMARY OF THE INVENTION

Briefly, in accordance with one aspect of the invention, the flux linkage of a reactor magnetic core is changed in synchronism with the ripple current component of a rectified a-c power source. This is accomplished by the rotation of a rotor in the core at a speed proportional to the ripple current frequency. By one aspect of the invention a salient pole armature is mounted in an air gap in the core such that when the armature is rotated on an axis normal to the flux flow, the air gap will be cyclically changed so as to vary the reluctance and hence the inductance of the magnetic device. If the speed or rotation is controlled so as to be proportional to the frequency of the ripple current and in proper phase relation therewith, the ripple current component will be substantially smoothed. A versatile variable inductive device is thus obtained whose inductance changes in unison with the instantaneous current so as to provide adequate smoothing with a minimum of active material.

By another aspect of the invention a wound armature connected in series with the core is rotatably mounted in the field thereof and rotated to change its sense in synchronism with the ripple current frequency such that the flux linkage of the system changes in synchronism with the ripple current to thereby smooth the ripple.

In the drawings as hereinafter described, a preferred embodiment and a modified embodiment are depicted; however, various other modifications and alternate constructions can be made thereto without departing from the true spirit and scope of the invention.

DESCRIPTION OF THE PREFERRED EMBODIMENT

Figure 1:
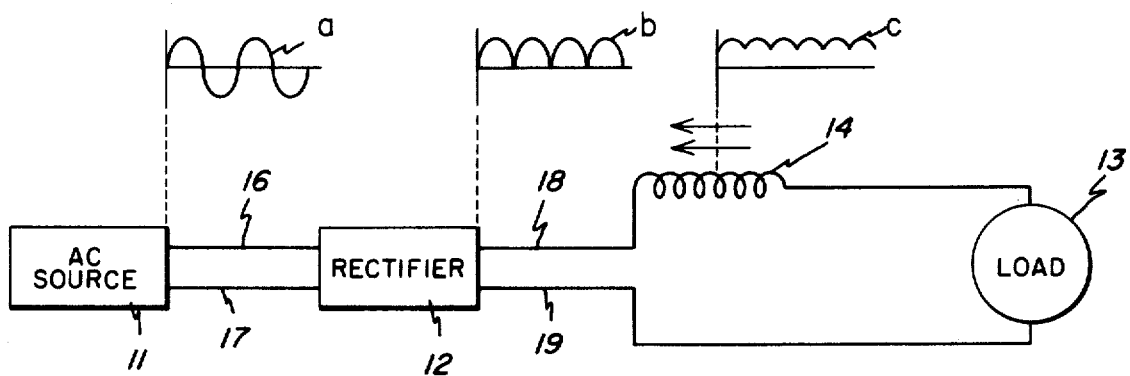
FIG. 1 shows a schematic electrical circuit diagram to which this invention is applied.

Reference is now made to the circuit of FIG. 1 comprising an a-c power source 11, a full wave rectifier 12, and a load 13. A variable inductive device 14 is connected in series between the rectifier 12 and the load 13.

The alternating current source 11, which for purposes of illustration is shown as a single phase type provides an alternating output designated by the letter $a$ along lines 16 and 17 to the rectifier 12. The full wave rectifier 12 in turn provides to the output lines 18 and 19 a pulsating unidirectional signal $b$ which has an appreciable alternating component or ripple. This undulation is smoothed by the response of the inductive device 14 so as to provide a load current c which is substantially constant with respect to time.

Before going further into the description of the apparatus of this invention it would be well to briefly discuss the underlying principles thereof. A general form of the equation for the generation of voltage by electromagnetic induction is $$e = \frac{\Delta n\phi}{\Delta t}$$

where $e$ is the induced voltage, n is the number of turns of the coil linking flux $\phi$, and $\Delta/\Delta t$ indicates rate of change with respect to time. The product $n\phi$ is commonly referred to as "flux linkage". (In the case of sinusoidal change and constant number of turns, this equation reduces to the familiar $$e = n\frac{d\phi}{dt}$$

In a passive inductor the magnetic flux is caused by the applied current. Where there is large direct current component of current, and an air gap is provided in the magnetic circuit, the preponderance of energy storage is in the air gap. The flux that is useful in inducing voltage is limited to the difference between the flux produced by maximum current and the flux produced by minimum current.

It is also known that variation in the air gap of a current-carrying inductor changes the reluctance of its magnetic circuit and induces a voltage. In this case the flux is changed by the change in air gap geometry.

The essence of this invention is that these two effects may be combined in the same inductor. With proper phase relationship between current ripple and air gap change, the voltages may be made additive producing more smoothing action than either effect alone. In other words if the variable inductance device can be modulated with respect to time, such that the value of the inductance varies greatly in sequential response to current flow change, then a pulsating unidirectional current flow to the device may be smoothed to a greater or lesser degree, depending on whether or not the respective phases are complementary or opposing. For example, if the area of the air gap can be varied in a sinusoidal pattern in direct sequence with the sinusoidal unidirectional current flow, or if the length of the air gap can be varied in a sinusoidal pattern in an inverse relationship with the current flow, then the variable inductance will be controlled accordingly and the smoothing of the pulsating current will be improved over that of a conventional inductance device. This is accomplished by the alternate storage and release of energy during the respective periods of higher and lower current flow in the pulsating current source.

Figure 2:
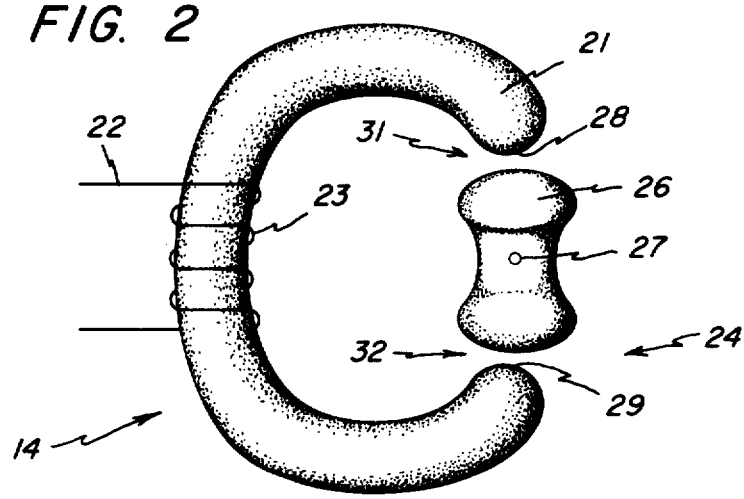
FIG. 2 is an illustration of the preferred embodiment of this invention.

Although various schemes and devices may be contrived to accomplish a controlled variance of the inductance by selectively changing the air gap length and cross sectional area, the preferred embodiment of this invention will be described in terms of a device by which the circuit reluctance is so changed. FIG. 2 shows an inductive device 14 comprising a C-shaped magnetic core 21 having a coil 22 with a plurality of turns 23 wound thereon. The coil 22 is connected in series in line 18 between the rectifier 12 and the load 13 of FIG. 1. In the open portion 24 of the C-shaped core 21, an armature 26 is mounted on an axis 27 disposed midway between the two core-ends 28 and 29. Air gaps 31 and 32 exist between the armature 26 and the core-ends 28 and 29 respectively. The shape of the armature is such that as it rotates on its axis 27, the air gaps 31 and 32 vary from a minimum distance which exists when the armature is aligned with the core-ends as shown, to a maximum distance which exists when the armature is angularly displaced by 90° from the position shown. The effects of varying these non-magnetic gaps in the inductor flux path tend to vary the reluctance of the circuit in accordance with the relationship $R=R_c+R_g$ where R=total reluctance $R_c$=reluctance of core structure alone $R_g$=reluctance of air gaps in the core since the reluctance of each of the air gaps may be expressed as $$R_g = K\frac{d}{A}$$

where $R_g$=reluctance of the gap

K=a constant d=width of the gap in a direction parallel to that of the flux flow thereacross A area of the gap as measured perpendicular to the flux the total circuit reluctance R is cyclically varied as the armature 26 is rotated. In accordance with the objects of this invention, the speed at which it is rotated and hence the frequency at which the total reluctance is varied, is controlled to be in sequence with the cyclic variations of the pulsating current, being delivered to the coil 22. For example, if the a-c source current which is rectified has a frequency of 25 Hz, then the ripple current component has a frequency of 50 Hz, and the two-pole armature 26 shown in FIG. 2 would be rotated at a frequency of 25 revolutions-per-second. Provided the correct phase relationship is established, the reluctance can thus be made to vary in proper relationship with the ripple current as contemplated in this invention.

Since the ripple current is semi-sinusoidal it is desirable for the time rate of change of flux linkage to vary in a semisinusoidal pattern. This is accomplished by the preferred use of a salient pole structure as shown in FIG. 2. It should also be noted that an armature having a greater number of poles may be used, and the frequency of rotation reduced accordingly. However, the two-pole armature is preferred for the reason that the highest rotational speed stores the most energy.

Since smoothing is accomplished by cyclic storage and release of energy, it is well to consider where energy storage takes place in the subject invention. Flux in a magnetic circuit is being decreased further than it would by self-inductance by means of mechanical modification of the magnetic circuit. At this point it requires mechanical work to make the physical change. This is the reason that the preferred embodiment shows a rotating armature making the change; the energy is supplied by the rotating mechanical system. During the opposite part of the cycle, energy is returned from the magnetic air unit to the rotating mechanical system. Rotary inertia of the mechanical system can be used as the added energy storage medium; the rotating armature need be driven with only sufficient net power to overcome mechanical losses.

It is easy to visualize many combinations that might be made to drive this device from other devices that might be required. An example would be to drive it from the motor of an auxiliary motor-alternator set.

Figure 3:
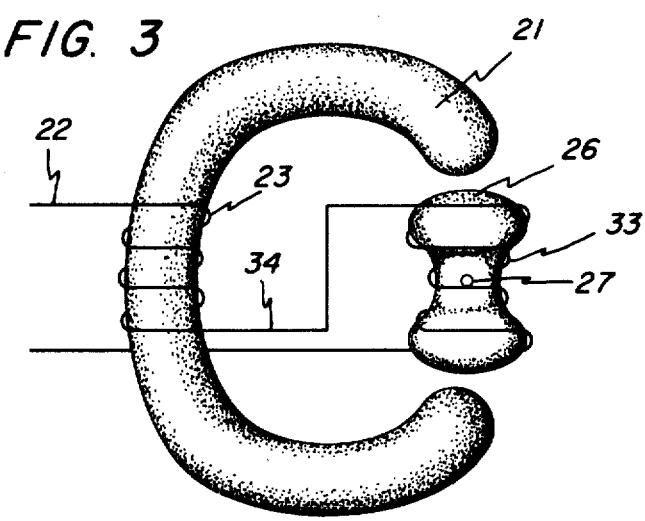
FIG. 3 is a modified embodiment thereof.

Referring now to the modified embodiment of FIG. 3 it will be seen that an armature 26 is again rotatably mounted in the open portion of a C-shaped magnetic core 21 as in FIG. 2. Further, the coil 22 forms windings 23 on the core. However, in this embodiment the windings 23 are connected in series with windings 33 disposed on the armature 26 by leads 34, connection being made by slip rings or any other suitable means. By rotation of the armature 26 at an appropriate speed the sense of the coil 23 is cyclically changed in synchronism with the ripple current, and the flux linkage is changed accordingly to effectively smooth the ripple.

In contemplation of the modified embodiment shown in FIG. 3 it is known that two coils on the same magnetic circuit have their separate self-inductances and also a mutual inductance. In a saturating device the equations are difficult to present simply; however, it can be seen intuitively that the flux linkage of two coils in series is much greater when the coils are connected cumulatively than when the coils are connected in opposition. A convenient means of changing the sense of one coil smoothly and cyclically is to construct it on a rotating armature.

The essence of this embodiment is that the self-smoothing of a passive inductor may be increased by reversing the sense of one winding in proper phase relationship with current ripple.

What I claim as new and desire to secure by Letters Patent of the United States is:

1. An inductor device for minimizing the ripple current component of a rectified a-c power source connectable to energize a load, comprising:

a magnetic core having a variable air gap;

b. a coil on said magnetic core adapted to be serially connected intermediate the output of the rectified power source and said load; and c. means for cyclically changing the geometry of said air gap and hence the flux linkage of said inductor device in synchronism with the ripple current, thereby cyclically inducing in said coil a voltage tending to be in substantially inverse phase relationship with the ripple voltage of said power source so as significantly to reduce said ripple current component.

2. An inductor device as set forth in claim 1 wherein said magnetic core comprises a fixed portion and a rotatable portion, with the rotatable portion being nonuniform on an axis normal to the flux flow so as to present a variable air gap upon being rotated; and wherein said air gap geometry changing means effects rotation of said rotatable portion in synchronism with said ripple current.

3. An inductor device as set forth in claim 2 wherein said rotatable portion comprises a salient pole structure and further wherein the rotation thereof causes the induced voltage to vary in a substantially sinusoidal pattern.

4. An inductor device for minimizing the ripple component of a rectified a-c power source connectable to energize a load, comprising:

a. a magnetic core having a rotatable portion;

b. a first coil on said magnetic core serially connected intermediate the output of the rectified power source and said load;

c. a second coil mounted on said rotatable portion of said magnetic core;

d. means for energizing said second coil; and e. means for rotating said rotatable portion of the core the sense of said second coil and hence the flux linkage of said inductor device in synchronism with the frequency of said ripple current, thereby cyclically inducing in said first coil a voltage tending to be in substantially inverse phase relationship with the ripple voltage of said power source so as significantly to reduce said ripple current component.

5. An inductor device as set forth in claim 4 wherein said second coil is connected in series to said first coil.

* * * * *

UNITED STATES PATENT OFFICE
CERTIFICATE OF CORRECTION

PATENT NO. : 3,894,279
DATED : July 8, 1975
INVENTOR(S) : Edward P. Priebe

It is certified that error appears in the above-identified patent and that said Letters Patent are hereby corrected as shown below:

Column 6, line 34, insert "so as to change" between "core" and "the"

Signed and Sealed this sixth Day of January 1976

[SEAL]

Attest:

RUTH C. MASON
*Attesting Officer*

C. MARSHALL DANN
*Commissioner of Patents and Trademarks*